United States Patent
Xia et al.

(10) Patent No.: US 8,778,174 B2
(45) Date of Patent: Jul. 15, 2014

(54) METHODS AND APPARATUS FOR TREATING WATER AND WASTEWATER EMPLOYING A CLOTH DISK FILTER

(75) Inventors: Yongming Xia, Kingwood, TX (US); Jeffrey S. Devine, The Woodlands, TX (US); Charles G. Dannemann, Willis, TX (US)

(73) Assignee: Alfa Laval Ashbrook Simon-Hartley Inc., Houston, TX (US)

( * ) Notice: Subject to any disclaimer, the term of this patent is extended or adjusted under 35 U.S.C. 154(b) by 811 days.

(21) Appl. No.: 12/905,454

(22) Filed: Oct. 15, 2010

(65) Prior Publication Data

US 2012/0091065 A1    Apr. 19, 2012

(51) Int. Cl.
*B01D 29/68* (2006.01)
*B01D 29/50* (2006.01)

(52) U.S. Cl.
USPC ...... 210/108; 210/333.01; 210/236; 210/413; 210/416.1; 210/791

(58) Field of Classification Search
None
See application file for complete search history.

(56) References Cited

U.S. PATENT DOCUMENTS

| | | | |
|---|---|---|---|
| 2,603,354 A * | 7/1952 | Way et al. | 210/747.5 |
| 2,650,810 A | 9/1953 | Nordell | |
| 2,997,284 A | 8/1961 | Nechine | |
| 3,116,021 A | 12/1963 | Born | |
| 3,339,901 A | 9/1967 | Walker | |
| 3,640,395 A | 2/1972 | Kinney | |
| 3,673,048 A | 6/1972 | Gidge et al. | |
| 3,755,055 A | 8/1973 | Lochner | |
| 4,090,965 A | 5/1978 | Fuchs | |
| 4,273,732 A | 6/1981 | Roediger | |
| 4,563,277 A | 1/1986 | Tharp | |
| 4,639,315 A | 1/1987 | Fuchs et al. | |
| 5,290,487 A | 3/1994 | Ludwig | |
| 5,356,532 A | 10/1994 | Wilkins et al. | |
| 5,374,360 A * | 12/1994 | Weis | 210/780 |
| 5,401,405 A * | 3/1995 | McDougald | 210/273 |
| 5,409,618 A | 4/1995 | Price | |

(Continued)

FOREIGN PATENT DOCUMENTS

| | | |
|---|---|---|
| CN | 201085959 Y | 7/2008 |
| JP | 2005270808 A | 10/2005 |

OTHER PUBLICATIONS

Benzlers, Series BD Screw Jacks, date unknown, Benzlers.

(Continued)

*Primary Examiner* — Robert James Popovics
(74) *Attorney, Agent, or Firm* — Jeffrey L. Wendt; The Wendt Firm, P.C.

(57) ABSTRACT

Methods and apparatus for treating water and wastewater include the step of flowing a suspended solids stream generally upward through a sludge blanket region of a cloth disk filter vessel, thus forming a partially treated effluent composition and a solids-enriched sludge blanket. The partially treated effluent composition is allowed to flow generally upward to a cloth filter zone in the vessel after contacting the sludge blanket. The methods include flowing the suspended solids stream through one or more distribution headers positioned in the sludge blanket. An option is to provide a sludge concentration zone in the sludge blanket region, allowing sludge to flow into the sludge concentration zone to form concentrated sludge. Other methods and apparatus include backwash assemblies that backwash substantially the entire filter cassette surfaces, with or without use of a sludge blanket zone. Either the backwash assemblies or filter cassettes move in the latter methods and apparatus.

8 Claims, 14 Drawing Sheets

(56) References Cited

U.S. PATENT DOCUMENTS

| | | | |
|---|---|---|---|
| 5,464,542 A * | 11/1995 | Grienberger et al. | 210/784 |
| 5,587,114 A | 12/1996 | Tharp | |
| 5,635,066 A | 6/1997 | Maurer | |
| 5,653,874 A | 8/1997 | Berry, III | |
| 5,690,864 A | 11/1997 | Tyer | |
| 5,876,612 A | 3/1999 | Astrom | |
| 6,090,298 A * | 7/2000 | Weis | 210/780 |
| 6,267,879 B1 | 7/2001 | Gil | |
| 6,294,098 B1 | 9/2001 | Bergmann | |
| 6,793,823 B2 | 9/2004 | Hubenthal et al. | |
| 6,858,140 B2 | 2/2005 | Smith et al. | |
| 7,270,750 B2 | 9/2007 | Galland et al. | |
| 7,300,585 B1 | 11/2007 | Holzworth et al. | |
| 7,485,231 B2 | 2/2009 | Yeom et al. | |
| 7,526,848 B2 | 5/2009 | Lindbo | |
| 7,537,689 B2 | 5/2009 | Ricketts | |
| 7,678,284 B2 | 3/2010 | Ricketts | |
| 7,736,526 B2 * | 6/2010 | Smith et al. | 210/780 |
| 7,807,050 B2 * | 10/2010 | Baumann et al. | 210/107 |
| 7,820,062 B2 * | 10/2010 | Ricketts | 210/791 |
| 7,833,424 B1 * | 11/2010 | Baumann et al. | 210/791 |
| 7,871,527 B2 * | 1/2011 | Smith et al. | 210/791 |
| 7,981,290 B2 * | 7/2011 | Baumann et al. | 210/333.1 |
| 8,048,296 B2 * | 11/2011 | Stevens | 210/107 |
| 8,101,090 B2 * | 1/2012 | Ralvert | 210/797 |
| 8,444,862 B2 * | 5/2013 | Ralvert | 210/780 |
| 8,518,273 B2 * | 8/2013 | Lownertz et al. | 210/791 |
| 8,647,516 B2 * | 2/2014 | Love | 210/798 |
| 2002/0050283 A1 * | 5/2002 | Bergmann | 134/33 |
| 2004/0124158 A1 * | 7/2004 | Smith et al. | 210/791 |
| 2004/0132373 A1 | 7/2004 | Muller | |
| 2004/0245190 A1 * | 12/2004 | Baumann et al. | 210/791 |
| 2005/0000870 A1 * | 1/2005 | Ricketts | 210/107 |
| 2005/0115911 A1 * | 6/2005 | Smith et al. | 210/791 |
| 2005/0161393 A1 * | 7/2005 | Baumann et al. | 210/411 |
| 2008/0011666 A1 * | 1/2008 | Baumann et al. | 210/411 |
| 2009/0178976 A1 | 7/2009 | Stevens | |
| 2010/0300957 A1 * | 12/2010 | Baumann et al. | 210/411 |
| 2010/0300989 A1 * | 12/2010 | Baumann et al. | 210/791 |
| 2011/0108496 A1 * | 5/2011 | Baumann et al. | 210/791 |
| 2011/0120960 A1 * | 5/2011 | Smith et al. | 210/791 |
| 2012/0091065 A1 * | 4/2012 | Xia et al. | 210/702 |
| 2013/0105415 A1 * | 5/2013 | Xia et al. | 210/791 |

OTHER PUBLICATIONS

Aqua-Aerobic Systems, "Aqua Cloth Media Filtration", 2006, 8 pages, Aqua-Aerobic Systems, Inc.

Ashbrook Simon-Hartley, Iso-Disc(TM) booklet, 2009, 47 pages, Ashbrook Simon-Hartley Operations, LP.

Furuya, A., "Evaluation and Design of a Cloth Disk Filter to Meet Title 22 Reuse Criteria", date unknown, publisher unknown.

* cited by examiner

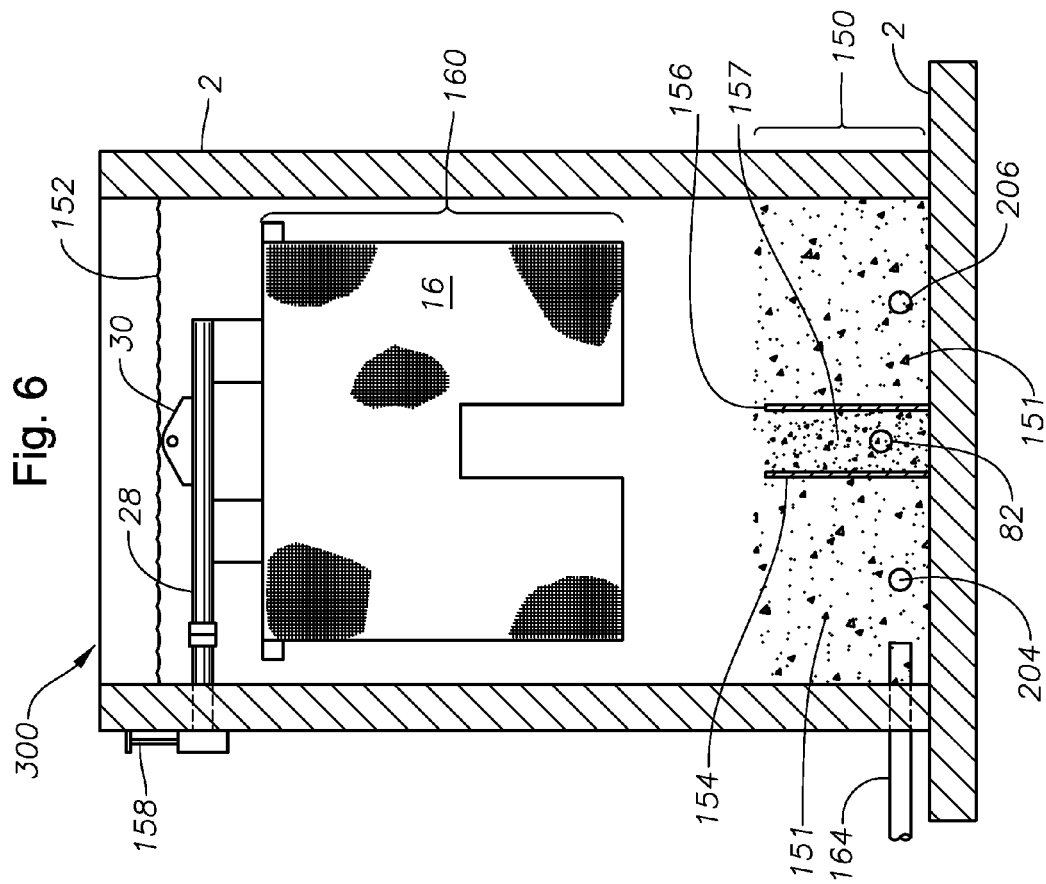
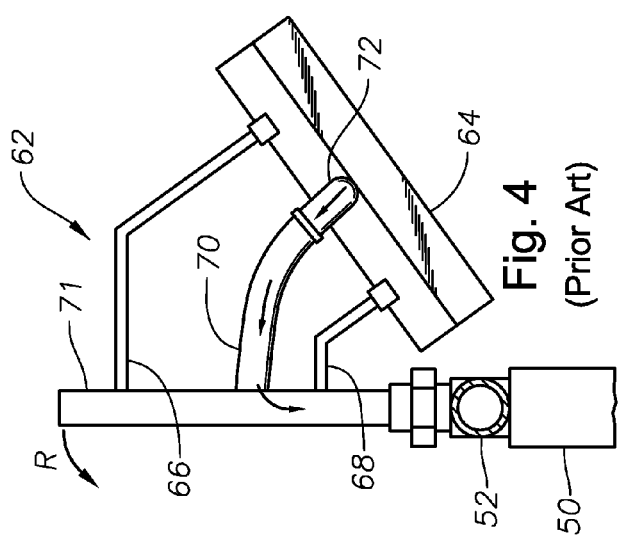
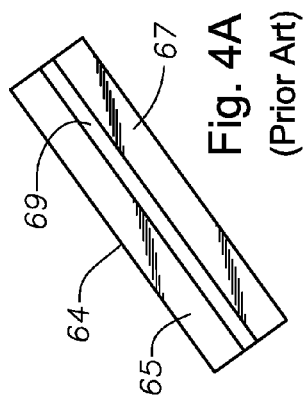

METHODS AND APPARATUS FOR TREATING WATER AND WASTEWATER EMPLOYING A CLOTH DISK FILTER

BACKGROUND

1. Field of the Disclosure

The disclosure is generally related to the field of water and wastewater treatment. More specifically, the disclosure relates to novel apparatus and methods of using same which address problems of removal of solids and chemically-induced flocs from residential, municipal, and/or industrial wastewater.

2. Description of Related Art

A conventional method for reducing solids from residential, municipal, and industrial wastewater is by using a cloth disk filter. Cloth disk filters are gaining in popularity in municipal tertiary and industrial wastewater filtration because of their low capital cost, acceptable solids removal efficiency, low filtration headloss, low reject rate (little or no chemical treatment) and small footprint.

A prior art cloth disk filter is illustrated schematically in FIG. 1, with parts cut away so that some of the key components may be better understood. The prior art cloth disk filter embodiment 100 comprises a tank or vessel 2, which may be concrete, metal, fiberglass-reinforced plastic (FRP) or other material. A source of screened, raw wastewater flows into the unit from an influent trough 4, and clean effluent leaves the unit through an effluent trough 6. Influent traverses an influent weir 8, encounters a scum or hydraulic optimization baffle 10, then approaches one or more filter cassettes 12.

As illustrated in FIGS. 2 and 3, a filter cassette 12 comprises a rigid support 14 (FIG. 2) and a filter cloth 16 (FIG. 3). Rigid support 14 includes, in this embodiment, an upper rigid grid 18 having a plurality of ribs 19, and two lower rigid grids 20 and 22, each having respective sets of ribs 21 and 23. Ribs 19, 21, and 23 form a plurality of slots 27 in upper and lower rigid grids, allowing liquid to flow through and up to an outlet 26, and finally through an effluent conduit 28. A space 24 is provided in rigid support 14 to allow the rigid support to straddle a central backwash conduit 52 as further explained herein. A lifting hook 30 is provided for lifting the cassettes out of the vessel and installing them into the vessel. Filter cloth 16 (FIG. 3) includes two legs 32 and 34, each having a front and back side (only the front is illustrated), the front and back sides fitting snuggly over lower rigid grids 20, 22 of rigid support 14. Front and back sides are held together by peripheral zippers 36, 37. Filter cloth 16 also typically includes strengthening materials 38, 40, which may be hook and loop fasteners, and a closure 42 which fits around outlet 26 of rigid support 14.

Referring again to FIG. 1, filter cassettes 12 are each held in vessel 2 by respective upper support hanger 44 and a lower support hanger 46. A longitudinal support beam 48 supports a vertical support column 50 (one column 50 for each cassette 12). A central backwash conduit 52 is connected to a sprocket/chain/motor assembly 54, 56, and 58, which also include a smaller drive sprocket 60. Vertical support columns 50 support central backwash conduit 52 and allow conduit 52, and components attached to it, to be rotated using the sprocket/chain/motor assembly, while the filter cassettes 12 remain stationary. Each cassette 12 has at least one dedicated backwash vacuum shoe assembly 62 positioned on one side of filter cloth 16 fluidly attached to central backwash conduit 52. In some embodiments, another dedicated backwash vacuum shoe assembly (not illustrated in FIG. 1) is positioned on the reverse side of each cassette, and positioned 180 degrees out of phase, so that when one shoe assembly is pointing in a first direction, its complementary shoe assembly is pointing in the opposite direction. (In some other prior art embodiments the filter cassettes 12 rotate during backwashing, while the backwash shoes remain stationary.) Various valves V1, V2, V3, V4, and V5 illustrated in FIG. 1 may be used for various purposes recognized by those skilled in this art, such as throttling or completely blocking flow, diverting flow, taking components out of service, and the like.

FIGS. 4 and 4A illustrate further details of one embodiment of a backwash vacuum shoe assembly 62, including a vacuum shoe 64, supports 66, 68 connecting vacuum shoe 64 to a rigid vacuum conduit 71, and a flexible vacuum hose 70 fluidly connecting rigid vacuum conduit 71 to vacuum shoe 64 through a connector 72. Fluid flows from vacuum shoe 64, through connector 72, flexible vacuum hose 70, and rigid vacuum conduit 71 during a backwashing operation is depicted by the curved arrows inside those conduits. The entire assembly 62 rotates, as shown by arrow R, by virtue of being connected to central backwash conduit 52. FIG. 4A illustrates the underside of vacuum shoe 64, illustrating that vacuum shoe 64 comprises first and second shoe components 65, 67, which define a slot 69 through which flows fluid and debris (such as floc accumulated on cloth filter 16) during backwashing.

Returning to FIG. 1, cloth disk filter 100 has a sludge settling area 80 at the bottom of vessel 2, as well as one or more sludge removal conduits 82 connecting through various valves and conduits 88 to backwash pumps 84, driven by motors 87. Pumps 84 and motors 87 are illustrated as outside of vessel 2, on a separate support 86, but in other embodiments could be inside vessel 2.

It should be understood that the cloth filter disk described in FIGS. 1-4 has many variations and configurations. In some commercial embodiments, the cassettes rotate and the backwash shoes are held stationary. The vessel may take many shapes, including round and rectangular. In some embodiments, a single effluent trough may be fed by dual banks of cloth disk filters on either side of the effluent trough. Some prior patents discussing cloth disk filters include U.S. Pat. Nos. 3,640,395; 4,090,965; 4,639,315; 5,635,066; 5,356,632; 5,409,618; 5,876,612; 6,267,879; 6,294,098; 7,300,585; and 7,537,689.

One of the main disadvantages of the cloth disk filter is the nature of the cloth disk filtration-surface filtration. The cloth medium is use to support the captured solids which deposit onto the cloth surface mainly by a straining filtering process. Once a cake layer forms on the cloth medium surface, cake filtration becomes the predominant filtering mechanism. Under the condition of disk filter filtration with chemical treatment, the cake resistance increases quickly with time because of the decreasing porosity and increasing thickness of solids deposit due to large quantity of chemical floc. This is unlike other filtration processes, such as granular media depth filtration. In depth filtration, the suspended particles can enter into the porous medium (grains) and move to the grain surface for attachment or retrain into the fluid. This process is repeated through the entire filter bed. Therefore the headloss building up in depth filtration is slower than that in surface filtration.

The frequency of employing filtration with chemical treatment is increasing and it has achieved an important role in wastewater treatment. Particularly, chemical treatment is used in phosphorous removal, algae removal, metal hydroxides removal, and high solids removal applications. In those applications, usually the cloth filter disk shows very short filter run and frequent backwash. A reject rate of 20 percent is not uncommon.

As noted in reference to the discussion of FIGS. 1-4, one commonly used cleaning mechanism is a rotary backwash arm. When filtration headloss reaches a filtration termination set point, a backwash flow control valve opens. Then a backwash pump starts and the backwash arm rotates around a central backwash conduit, described in FIG. 1. The filtered water that passed through the filter cloth is pulled in reverse direction by the backwash pump through the filter cloth. The backwash pump exerts vacuum action by pulling water from the inside of the filter cassette backwards through the cloth and into the backwash shoe, thereby removing solids captured on the filter cloth in the previous filter run. The backwash wastewater flows into the backwash arm to the central backwash conduit, at last to the backwash suction pump before discharge. In these cleaning mechanisms, the backwash arm sweeps and cleans a circle area of the square-shaped (or other-non-circular-shaped) filter cassette surface. In embodiments using square-shaped filter cassettes, because the rotating backwash arm cleans a circle area of the square shaped filter cloth surface, a significant (approximately 22.5%) of the square filter cloth area remains fouled and unavailable for filtration. The solids and sludge are built up there in a long run. It is not only a waste of filtration area but also has negative affect on filter effluent quality and aesthetics of the process. Another option presently practiced is to use a more expensive and difficult to fabricate circular disk filter cassette. In this practice, the cleaning shoe remains fixed and the circular disk filter cassette is rotated for circular disk cleaning.

U.S. Pat. Nos. 7,270,750 and 7,485,231 describe wastewater treatment processes for biologically removing wastes incorporating a "sludge blanket" in activated sludge clarification and aeration ponds. While the patents do describe use of sludge blanket filtration, there is no teaching, suggestion or other discussion of reducing the load of solids to filter media in a tertiary filtration unit, such as a cloth disk filter, using sludge blanket filtration. There would be little, if any expectation or prediction of success in incorporating a sludge blanket in a cloth disk filter, as evidenced by the lack of any discussion in the trade on the issue. Most likely this is due to experience with the problems mentioned above regarding cake resistance on cloth filter cassettes increasing quickly with time because of the decreasing porosity and increasing thickness of solids deposit due to large quantity of chemical floc. It would not be expected that addition of a sludge blanket would alleviate this problem.

There is a need in the wastewater treatment art for improved cloth filter disk apparatus and methods of employing cloth disk filters in water and wastewater treatment facilities, which feature reduced load on the cloth filter media while maintaining or increasing the reliability and consistency of the cloth disk filter to function as a tertiary filter. There is also a need for using all or substantially all of the filter surface area of cloth disk filter cassettes, and for backwash methods and apparatus which clean substantially all of the filter surfaces in an efficient manner, which may include moving the cleaning shoe rather than moving the entire filtration cassette.

SUMMARY

Apparatus and methods of the present disclosure reduce or overcome deficiencies of the prior art.

In accordance with a first aspect of the present disclosure, a method of treating water or wastewater comprises:

a) flowing a suspended solids stream generally upward through a sludge blanket region of a cloth disk filter vessel, thus forming a partially treated effluent composition and a solids-enriched sludge blanket; and b) flowing the partially treated effluent composition generally upward to a cloth filter zone in the vessel, the cloth filter zone comprising at least one cloth filter media cassette, producing a filter cake on external surfaces of the cloth filter media and a treated effluent stream from at least one filter cassette.

Certain methods include those wherein the step of flowing the suspended solids stream generally upwards through a sludge blanket region comprises flowing the suspended solids stream through one or more distribution headers positioned in the sludge blanket.

In still other methods within this disclosure, the suspended solids stream is a chemically-induced flocculated stream, and the flocculated stream percolates up through the sludge blanket comprising previously flocculated solids.

Other methods of this disclosure comprise providing a sludge concentration zone in the sludge blanket region, and allowing sludge to flow into the sludge concentration zone to form concentrated sludge.

Yet other methods comprise removing at least a portion of the concentrated sludge from the sludge concentration zone. In yet other methods the cloth disk filter has a hydraulic loading rate ranging from about 3 to about 6 gallons per minute per square foot of filter area ($gpm/ft^2$), or from about 2 to about 4 $gpm/ft^2$.

Certain other methods comprise backwashing one or more of the cloth disk filters periodically using one or more rotating vacuum shoe assemblies. In certain other embodiments, one or more of the filter cassettes rotate on a central shaft while the backwash shoes remain stationary during backwashing. In certain other embodiments, backwashing may be accomplished using cross-width backwash arms or hoods that traverse up and down and remove waste from substantially all of the surface area of the filter cloths. Yet other methods may comprise slideably moving one more, or all, of the cloth disk filter cassettes vertically in vertical cassette guide members, allowing the cassettes to be moved vertically up and down adjacent one or more stationary cleaning shoes. As used herein, the term "adjacent" when discussing the relative positions of a backwash arm and filtration material, includes both situations where cleaning shoes or backwash arm or hoods touch the filter material, and situations where there is no contact between the backwash assemblies and the filtration materials. In certain embodiments, the sludge blanket/filtration vessel may make use of a rake type mechanism or other mechanical means to help move the sludge blanket to a draw-off point for collection and removal.

Certain methods include wherein at least a portion of the sludge in the sludge blanket region is removed from the vessel.

Yet other methods may include wherein the sludge in the sludge blanket region is induced to coalesce by positioning one or more coalescing plates in the sludge blanket region.

Still other methods may comprise wherein the filter cloth media is selected from woven and nonwoven filter cloth media. In certain methods, the filter cloth is a needled nonwoven polyamide filter media. The filter cloth may comprise a variety of materials including acrylic or polyester cloth material, nylon or other carpet like material, synthetic or metallic screen material, and the like, as further explained herein.

Certain methods within this disclosure include monitoring a fluid level in the vessel and starting backwashing upon reaching a setpoint level in the vessel. In certain methods within this disclosure, filtration is continuous during backwashing.

Another aspect of this disclosure is an apparatus comprising:
a) a vessel having a floor and walls defining a cloth filter zone comprising one or more cloth disk filter cassettes positioned vertically therein, the cassettes removably positioned about a central, rotatable conduit, and one or more backwash assemblies fluidly connected to the central conduit and rotatable therewith, one or more of the backwash assemblies having a backwash shoe positioned adjacent a major filtration surface the one or more cloth filter cassettes; and
b) one or more influent distribution headers positioned inside the vessel substantially near the floor of the vessel for routing a suspended solids stream up through a sludge blanket formed in a sludge blanket zone above the floor during operation of the apparatus, the sludge blanket zone extending vertically and forming a liquid interface with the cloth filter zone.

Apparatus of this disclosure include those comprising two or more vertical plates connected to the floor and extending vertically therefrom in the sludge blanket zone, spaced apart a distance sufficient to form a sludge concentrator region in the sludge blanket zone.

Yet other apparatus embodiments within this disclosure comprise one or more conduits in the sludge concentrator zone fluidly communicating with a point outside of the vessel.

In still other apparatus embodiments, one or more conduits fluidly connect the sludge blanket zone to a point outside of the vessel. Certain embodiments include one or more of the conduits fluidly connecting the sludge blanket zone of the vessel with an inlet trough that feeds the influent distribution headers.

In certain apparatus embodiments, the apparatus is part of a packaged wastewater treatment plant.

Certain other apparatus embodiments within this disclosure comprise one or more plates connected to the floor and/or one of the walls extending therefrom into the sludge blanket zone, sufficient to further coalesce sludge in the sludge blanket zone. One or more of the plates may be selected from the group consisting of flat plates and corrugated plates.

In certain embodiments an effluent box may be integral with the vessel, and in certain other embodiments, a level switch may be included that controls treated effluent flow from the vessel and/or backflushing of the filter cloth media.

Another aspect of this disclosure is an apparatus comprising:
a) a vessel having a floor and walls defining a cloth filter zone comprising one or more cloth disk filter cassettes positioned substantially vertically therein, at least one of the cassettes removably positioned in respective vertical cassette guide members; and
b) at least one cassette having associated therewith at least one backwash assembly fluidly connected to a backwash conduit positioned to one side of the cassettes, each backwash assembly comprising a backwash arm (sometimes referred to herein as a hood) positioned adjacent at least one main filter surface of each cloth filter cassette, each arm slideable in respective vertical backwash arm guide members and dimensioned to backwash substantially all of the main filter surface. (Alternatively, certain embodiments may comprise slideably mounting one or more, or all, of the cloth disk filter cassettes in vertical cassette guide members, allowing the cassettes to be moved vertically up and down adjacent stationary cleaning shoes. While this may be more challenging to build and operate, such an embodiment could have a benefit of very easy cassette inspection and removal.)

In certain embodiments the backwash assembly comprises first and second main filter surface backwash arms for each cassette, in other words, the first main filter surface has at least one backwash arm fluidly connected to the backwash conduit, and the second main filter surface has at least one backwash arm fluidly connected to the backwash arm. In certain embodiments the backwash arms are cross-width backwash arms, meaning that they are substantially horizontal.

Certain embodiments comprise one or more influent distribution headers positioned inside the vessel substantially near the floor of the vessel for routing a suspended solids stream up through a sludge blanket formed in a sludge blanket zone above the floor during operation of the apparatus, the sludge blanket zone extending vertically and forming a liquid interface with a cloth filter zone.

In these embodiments, the backwash arm (or arms) replace the rotary backwash arm (or arms). A conduit is used to connect each the backwash arm to the backwash header, which is located to one side of the filter cassette(s) and beneath the top level of the filter cassette(s), or in certain embodiments, just above the filter cassettes. Where the backwash header is fixed in relation to the vessel, the conduits connecting the backwash arms and the backwash header may be flexible conduits, such as flexible hoses. Rigid conduits may be used in other embodiments, for example a telescoping rigid conduit. Also, in embodiments where the backwash header is moveable (such as when rigged to a pivot joint) and not fixed, the conduits fluidly connecting the back wash header and the backwash arms may be rigid.

When filtration headloss reaches a filtration termination set point, a backwash flow control valve opens. Then the backwash arm(s) move vertically, sweeping the filter cloth surface from the bottom to top (or alternatively from top to bottom). In apparatus within this embodiment, the backwash arm is driven by a drive assembly, which is located on the top of filter. In certain embodiments, the drive assembly comprises a drive frame weldment which supports a drive motor, a drive shaft, a miter gear box, lifting screw jacks, and ancillary mechanisms (such as the aforementioned vertical backwash arm guide members) to impart the vertical cleaning (backwash) motion. In certain embodiments, the backwash arm travel stop is controlled by a proximity switch, for example an infrared proximity switch, or other acceptable motion controller. Certain embodiments comprise a backwash pump fluidly connected to the backwash header. In certain embodiments, the backwash pump is not required. Backwash driving head could simply be the level difference between the filtration termination set level and the backwash header discharge level, thereby eliminating the need for the backwash pump.

Compared to previously known rotary backwash systems where backwash arms rotate about a central backwash header using rectangular cloth filter cassettes (or systems where the cassettes rotate and the backwash arms are stationary), total filtration area may increase by up to about 30 percent, with little or no negative effect on filter effluent quality and aesthetics of the process due to the corner dead area of the filter cloth surface. Another benefit may be the elimination of two stainless steel swivel joints with their possible mechanical failures. Furthermore, the effluent header may be made of PVC instead of stainless steel. And as noted, in certain embodiments it may be possible to eliminate the backwash pump.

Methods of treating water or wastewater using the apparatus disclosed herein are also considered within this disclosure.

Further aspects and advantages of the disclosure will become apparent by reviewing the description of embodiments that follows.

BRIEF DESCRIPTION OF THE DRAWING

For a more complete understanding of the present disclosure, and the advantages thereof, reference is now made to the following descriptions taken in conjunction with the accompanying drawings, which are representative illustrations and not necessarily to scale, and in which:

FIGS. 1-4 and 4A illustrate schematically aspects of a prior art cloth disk filter apparatus and method;

FIGS. 6, 7 and 8 illustrate schematic end elevation views, partially in cross-section with parts broken away, of three other apparatus embodiments of this disclosure employing a sludge blanket in a cloth disk filter;

Figure 1:
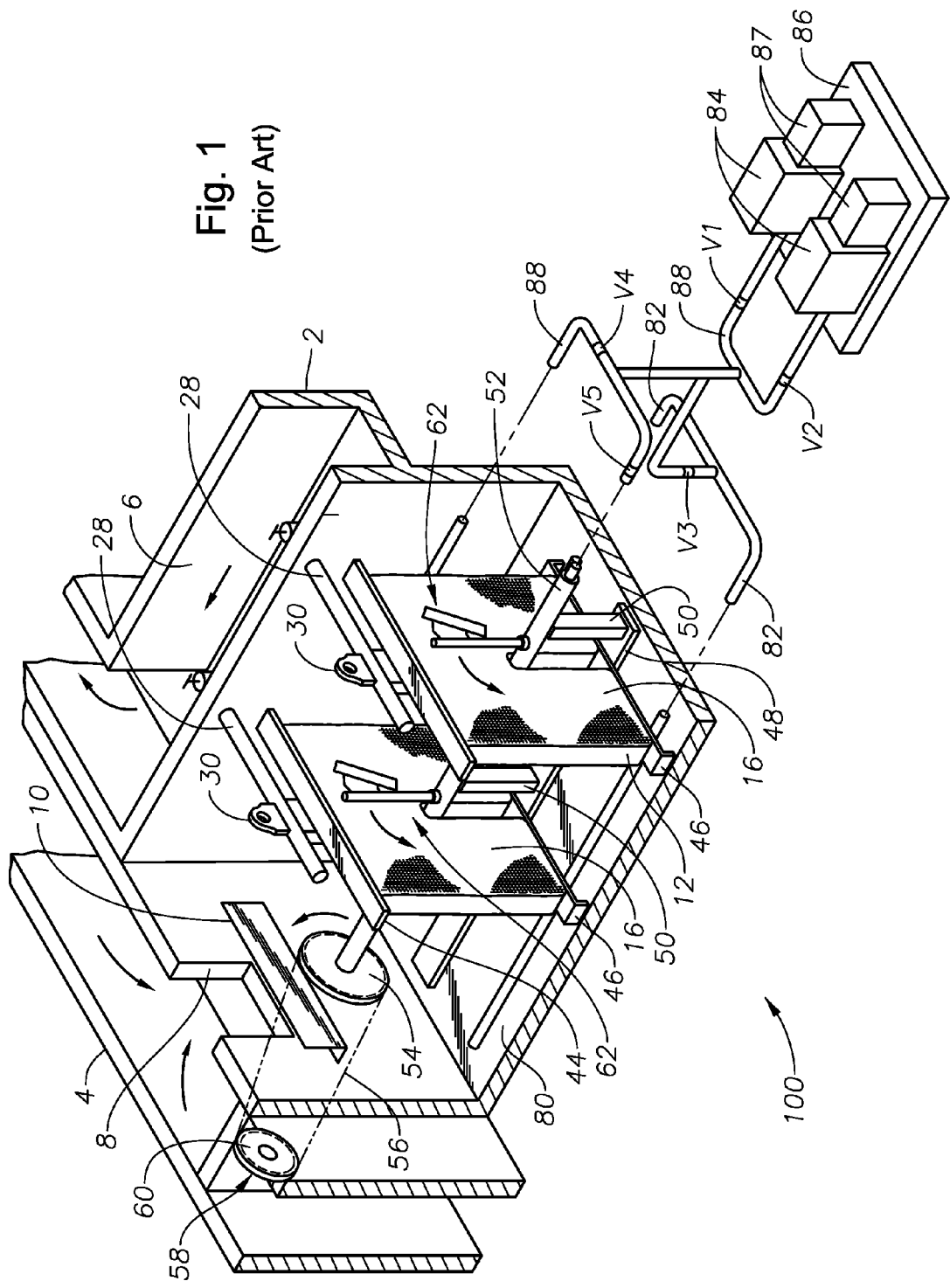
Figure 2:
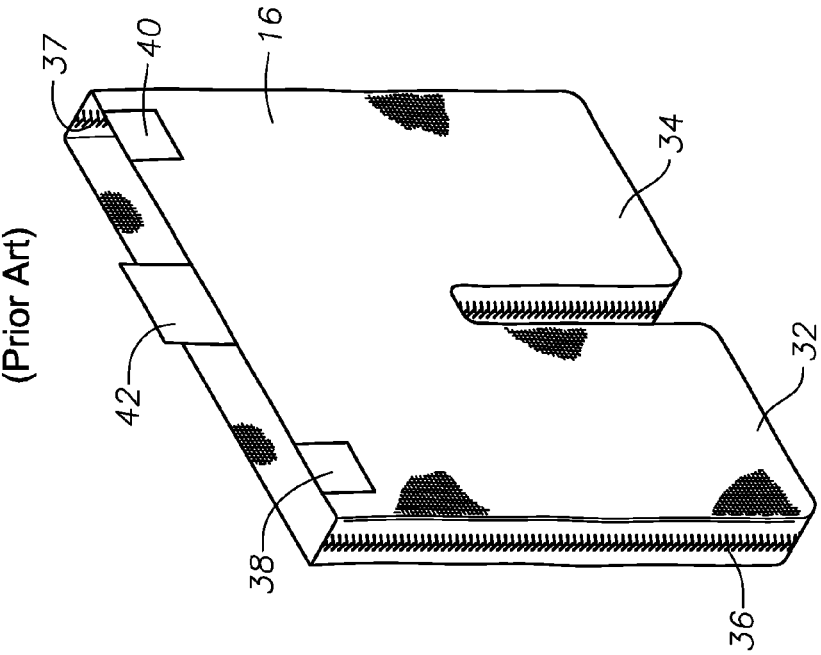
Figure 3:
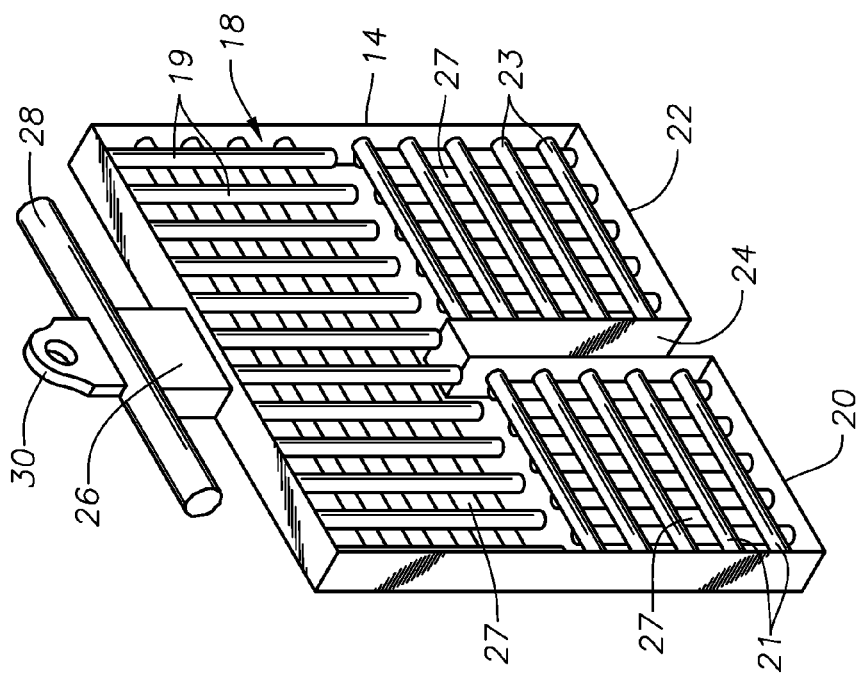

It is to be noted, however, that the appended drawings are not to scale and illustrate only typical embodiments of this disclosure, and are therefore not to be considered limiting of its scope, for the apparatus and methods of the disclosure may admit to other equally effective embodiments. Identical reference numerals are used throughout the several views for like or similar elements.

DETAILED DESCRIPTION

It will be noted that the prior art processes and apparatus such as exemplified schematically in FIGS. 1-4 and 4A do not disclose or suggest the combination of sludge blanket filtration zone with a cloth disk filter (either of the rotating disk type, or the non-rotating disk type, as illustrated). This arrangement has advantages in reducing the load of solids to the cloth filter media, increasing the performance of the cloth disk filter and decreasing the amount of solids that flow to the cloth filtration media, thereby not only reducing cleaning (backwashing) requirements for the cloth filtration media, but also greatly reducing the reject rate. Nor do the previously known processes and apparatus disclose or suggest backwash assemblies comprising backwash arms that clean substantially the entire filter surface, either alone or in combination with sludge blanket zone and a filter cloth zone. The use of the disclosed backwash assemblies (either of the moving or stationary type) eliminates underwater rotating seals that may leak; thereby, contaminating the filtered product and/or require lubrication and maintenance.

For comparison purposes, FIGS. 1-4 illustrate schematically a prior art cloth disk filter embodiment 100, which was described previously in the background section. As indicated previously, prior art embodiment 100 does not include facilities allowing screened water or wastewater to flow upward through sludge blanket region 150 formed on the bottom of vessel 2, nor does it teach or suggest backwash assemblies comprising backwash arms that are able to clean substantially all of the filter cloth surface. As used herein, "substantially all of the filter cloth surface" means 90 percent, or 95 percent, or in certain embodiments, 100 percent of the filter cloth surface.

Figure 5:
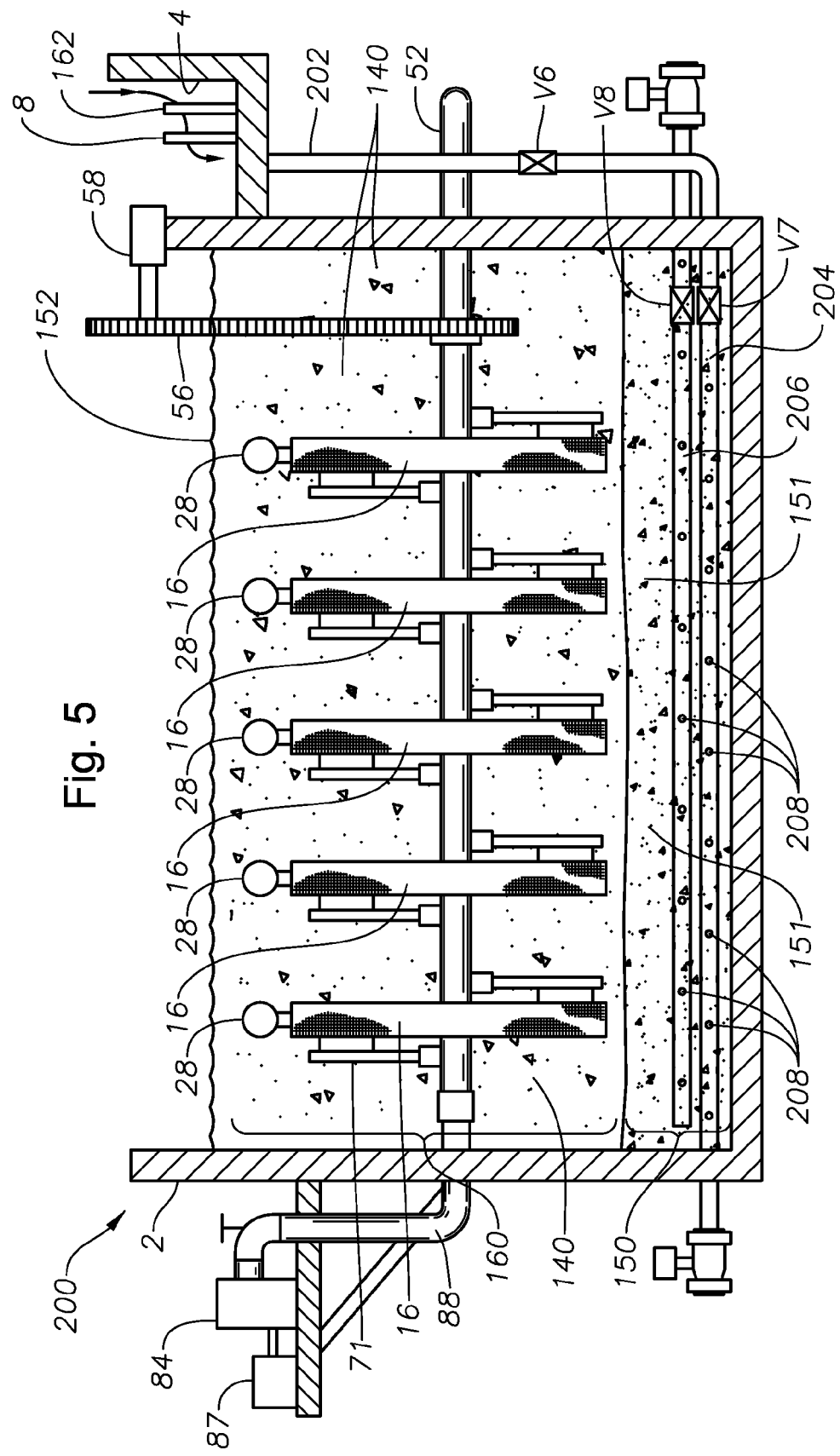
FIG. 5 illustrates schematically a side elevation view, with some parts broken away, of one apparatus embodiment of the disclosure employing a sludge blanket in a cloth disk filter.
Figure 7:
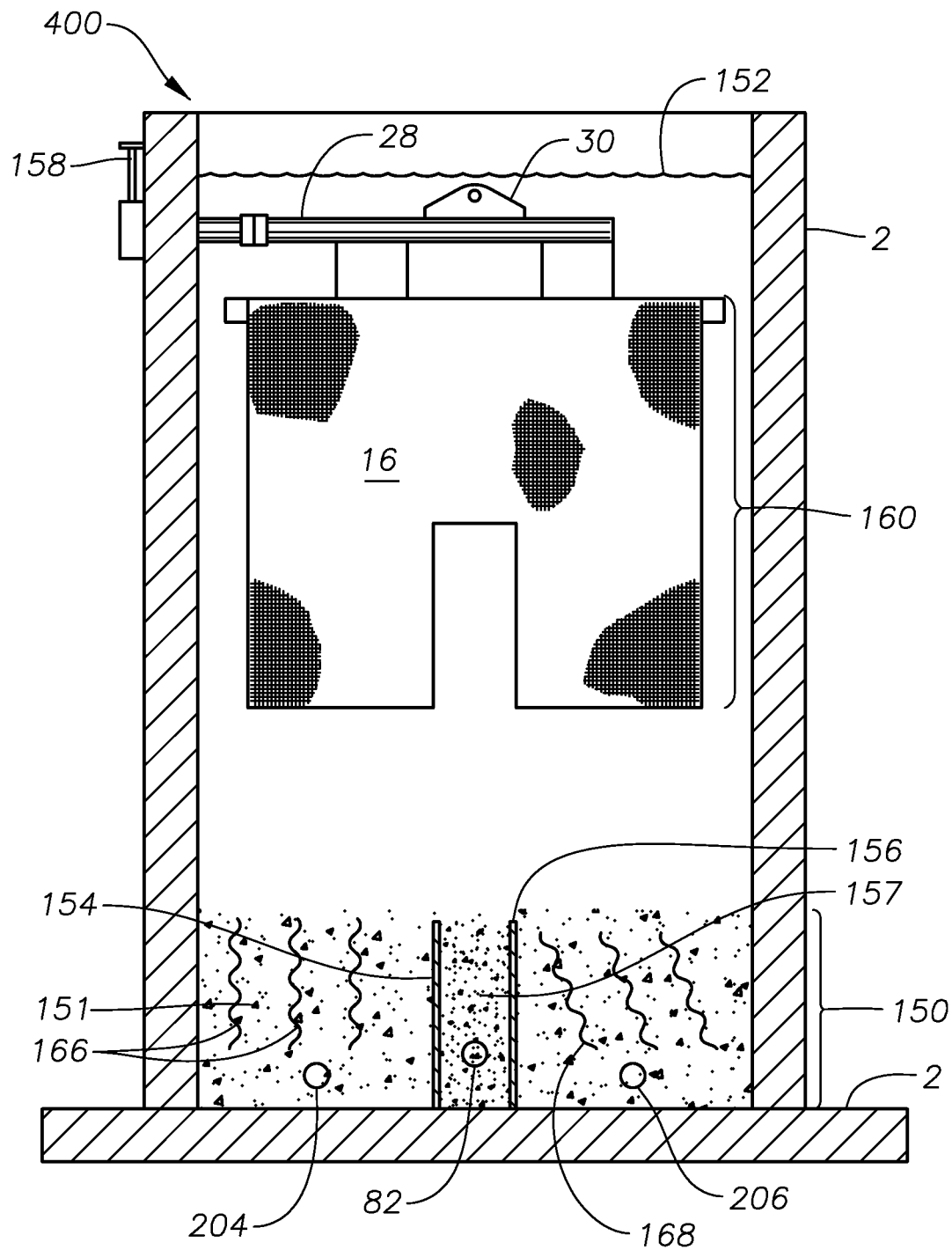
Figure 8:
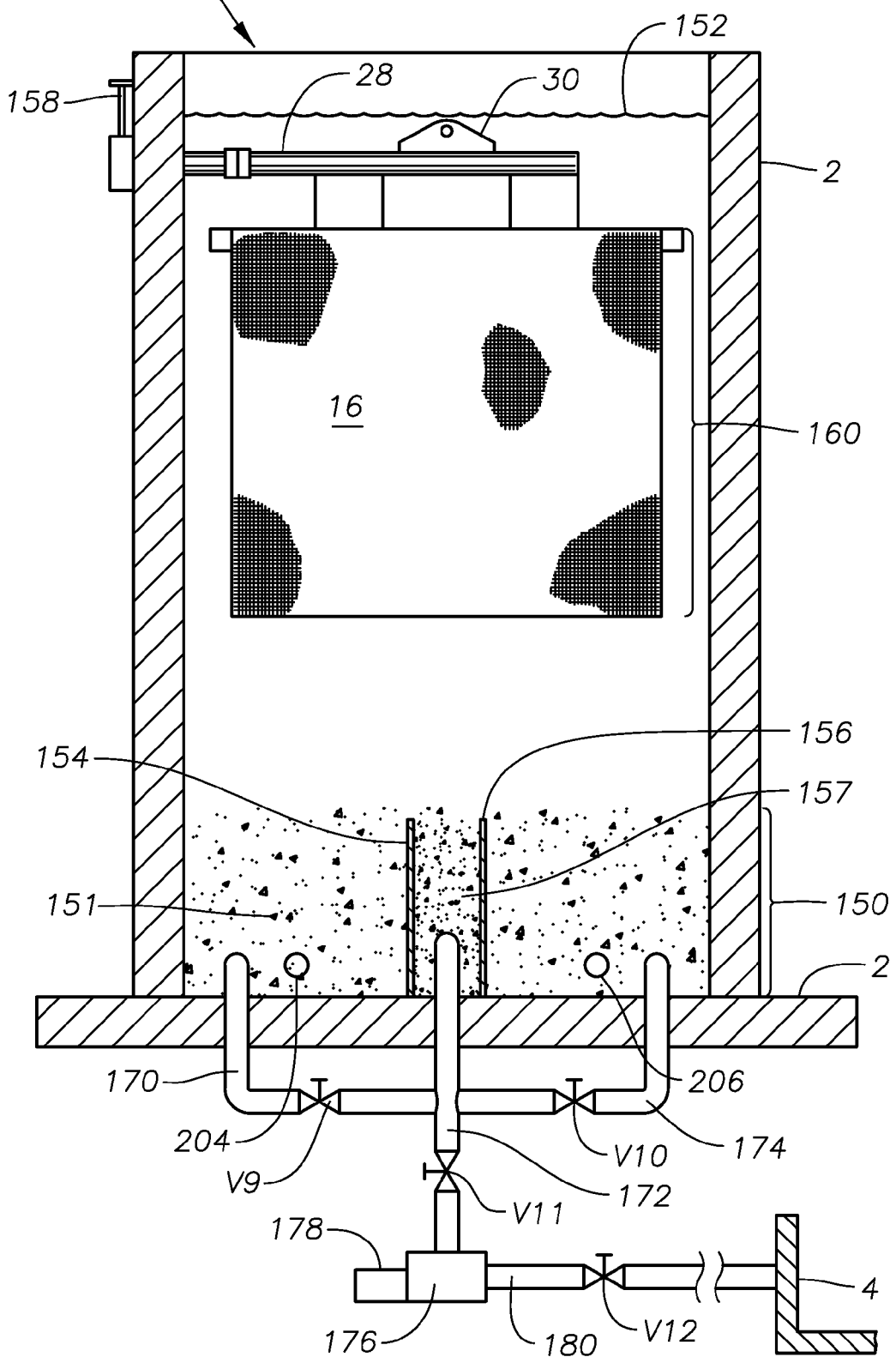

The inventors herein have conceived methods and apparatus utilizing a combination of a sludge blanket and a cloth disk filter, and have further conceived cloth disk filter apparatus and methods of using same wherein substantially all of the cloth filter surfaces are backwashed (with or without the sludge blanket aspect). FIG. 5 illustrates schematically an apparatus and method of this disclosure employing a combination of a sludge blanket and a cloth disk filter. Embodiment 200 includes an influent conduit 202, in this embodiment retrofitted into an existing influent trough 4, but this is not necessary in new installations. Embodiment 200 includes an influent screen 162 and V-notch weir 8, which direct influent through conduit 202 to influent distribution headers 204, 206 positioned just above the floor of vessel 2. As illustrated in FIGS. 6-8, influent distribution headers 204, 206 are generally positioned parallel to the side walls of vessel 2, but this is merely one possible arrangement. For example, another possible arrangement would be to have "T" or "X" shaped headers. In any case, headers 204, 206 each have a plurality of outlet holes or apertures 208 which allow influent to flow out of distribution headers 204, 206 and into sludge blanket zone 150. Influent percolates through sludge blanket zone 150, allowing flocculated solids in the influent to intimately contact previously flocculated material and sludge in sludge blanket 151. The influent distribution also creates a quiescent environment (low velocity currents) to help prevent disturbance of the sludge blanket. Water level 152 in vessel 2 is monitored and controlled by initiating backwashing using the assemblies previously described. Any flocculated solids 140 that are not captured in sludge blanket 150 are routed to the cloth 16 of filter cassettes 12. Valves V6, V7, and V8 may be used to throttle or completely shut off flow of influent to distribution headers 204, 206. They may also be automatic flow-controlled valves, communicating with a PLC or other type of automatic controller to control level 152 according to a setpoint level and/or setpoint flowrate.

FIGS. 6, 7, and 8 illustrate schematically embodiments 300, 400, and 500, respectively of the disclosure, focusing on different optional components and features of apparatus and methods of this disclosure. It should be noted that the schematic diagrams of FIGS. 6, 7 and 8 do not illustrate, for simplicity, many of components of commercial units, but those skilled in the art will readily understand this. As in embodiment 200 of FIG. 5, embodiments 300, 400 and 500 allow some or all influent water or wastewater to be routed via one or more conduits to influent distribution headers 204, 206, or some other arrangement of influent distribution so that flocculated solids in the influent contacts previously flocculated solids in sludge blanket region 150 without excessive disturbance of the sludge blanket. FIG. 6 illustrates an embodiment 300 where a sludge concentration zone 157 is allowed to form between a pair of vertical plates 154, 156 extending upward from the floor of vessel 2. Sludge concentration zone 157 may be described as a quiescent thickening zone. It needs not to be located as illustrated in the middle of the vessel, this being only one embodiment. Embodiment 300 also illustrates an optional fluid connection 164 that may allow sludge 151 to be withdrawn from sludge blanket zone 150, for example to recycle sludge 150 to a process unit upstream of the cloth disk filter. A conduit 82 is provided for withdrawing concentrated sludge from sludge concentration zone 157 when desired. Concentrated sludge is typically routed to a belt filter press or to storage prior to being processed in a belt filter press, or other type of dewatering press. The dewatered sludge may be burned, landfilled, or otherwise disposed by alternate acceptable means if it meets applicable quality standards. A knife gate valve 158 may be placed in effluent conduit 28.

Referring now to FIG. 7, embodiment 400 is illustrated emphasizing other optional features. Embodiment 400 includes corrugated plates 166, 168, fastened to walls of vessel 2. Corrugated plates 166, 168 may be used to induce faster coalescence of flocs, or to maintain a certain consistency of floc in sludge blanket zone 150. This media provides a suitable surface for individual flocs to meet and grow, or coalesce, into larger flocs. As the individual flocs grow in size the buoyancy of the flocs decrease, and fall toward the floor of the vessel and/or aggregate in the sludge blanket zone due to the fact that the specific gravity of the floc is more than the specific gravity of water. Plates 166 are illustrated as substantially vertical, while plates 168 are illustrated as canted at an angle to vertical, for example at an angle from vertical of 10 degrees, or 20 degrees, or 30 degrees, or 40 degrees, or 45 degrees. One or both arrangements may be employed in various embodiments of modified cloth disk filters within the present disclosure. They may extend through only a part of the sludge blanket zone, or through the entire thickness of the sludge blanket zone. The sludge blanket zone vertical thickness or depth depends on many factors, but in general may range from 1 percent or less of the total depth of liquid and sludge in vessel 2, ranging up to just below the bottom of the filter cassettes 12 in cloth filter zone 160. For large vessels, in some embodiments the sludge blanket may be 40 inches or more.

FIG. 8 illustrates schematically another apparatus and method embodiment 500, featuring a set of conduits 170, 172, 174, and 180 and valves V9, V10, V11, and V12, whose function will now be explained. Conduits 170, 174 fluidly connect sludge blanket zone 150 with points outside of the apparatus, for example, to components upstream or downstream of the apparatus. An example of an upstream apparatus might be a clarifier. Example of a downstream apparatus might be a belt filter press or belt sludge thickener, or a combustion apparatus. Similarly, conduit 172 fluidly connects sludge concentration zone 157 with points outside of the apparatus, for example, to components upstream or downstream of the apparatus. An example of an upstream apparatus might be a clarifier. Example of a downstream apparatus might be a belt filter press or belt sludge thickener, or a combustion apparatus. Pump 176 and motor 178 may be used for transferring concentrated sludge from sludge concentration zone 157, or from sludge blanket region 150, upon appropriate opening and closing of valves V9, V10, V11, and/or V12, which may be automated via connection to a PLC, as may pump 176 and motor 178. Embodiment 500 also illustrates that the cloth filter 16 and its support grid may not have a space to fit over and around a backwash conduit, as in some embodiments the backwash systems of FIGS. 9-11 may be employed.

Figure 9:
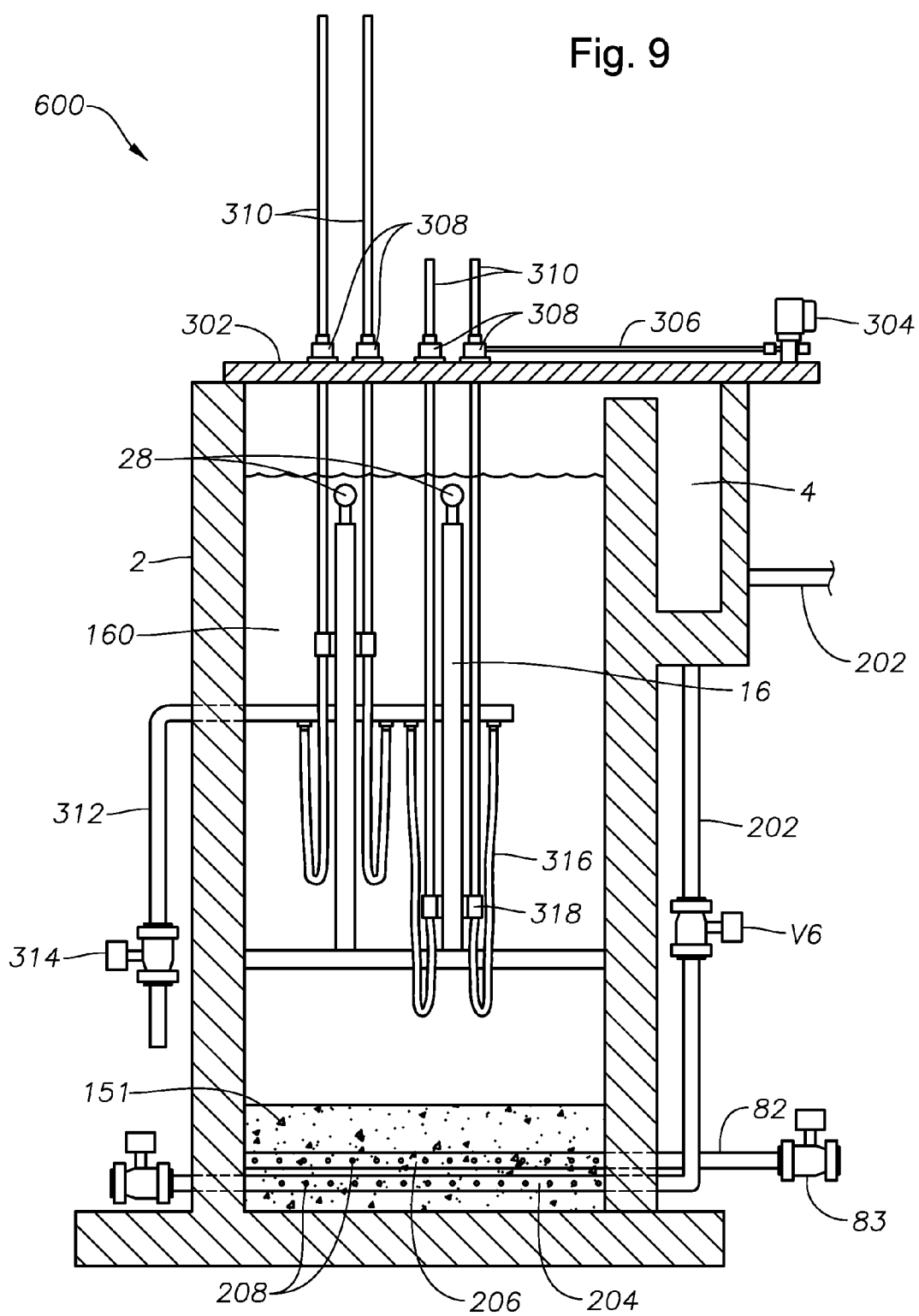
FIG. 9 is a schematic cross-sectional view.
Figure 10:
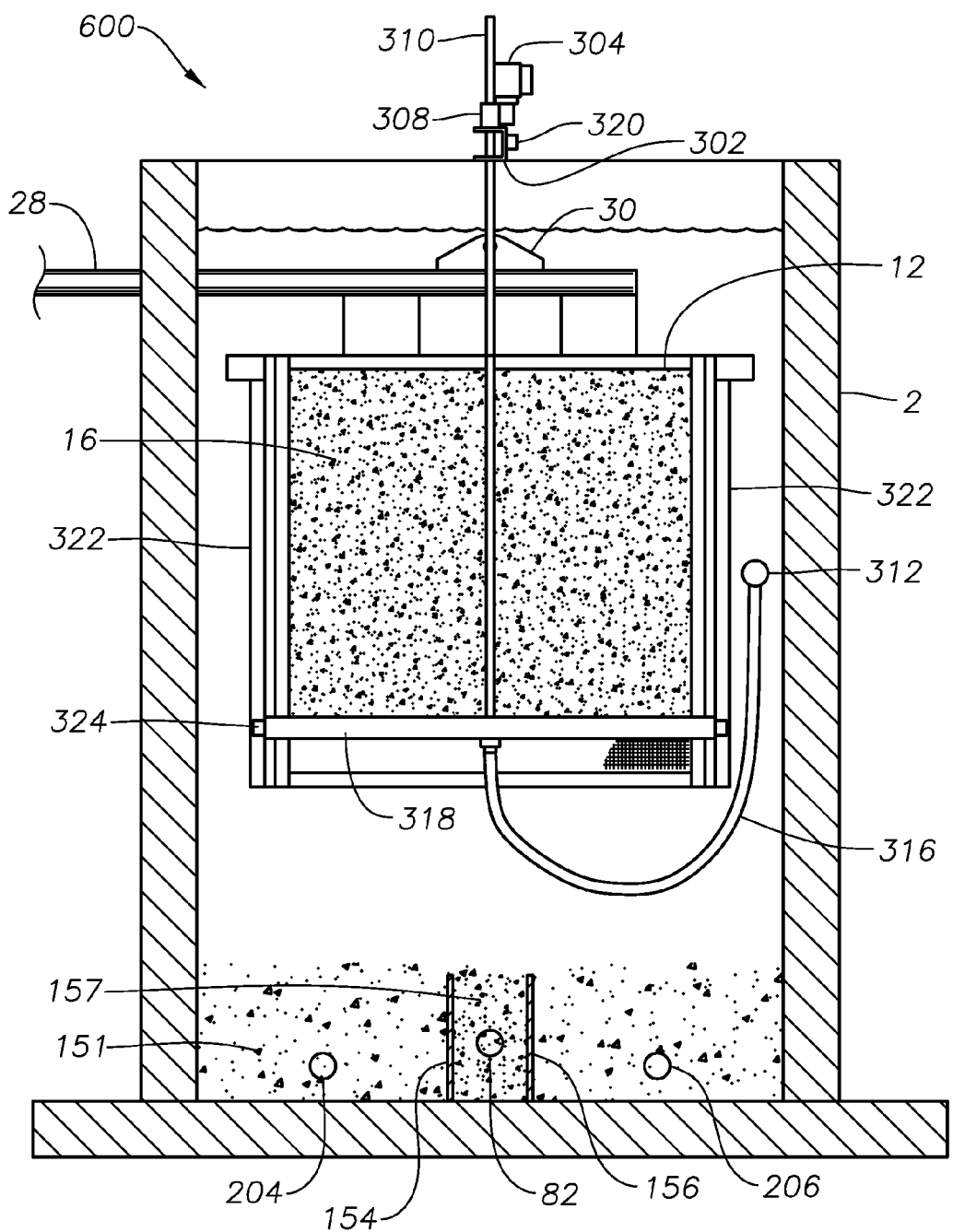
FIGS. 10 and 11 are schematic end elevation views, respectively, of another cloth disk filter embodiment in accordance with the present disclosure.
Figure 11:
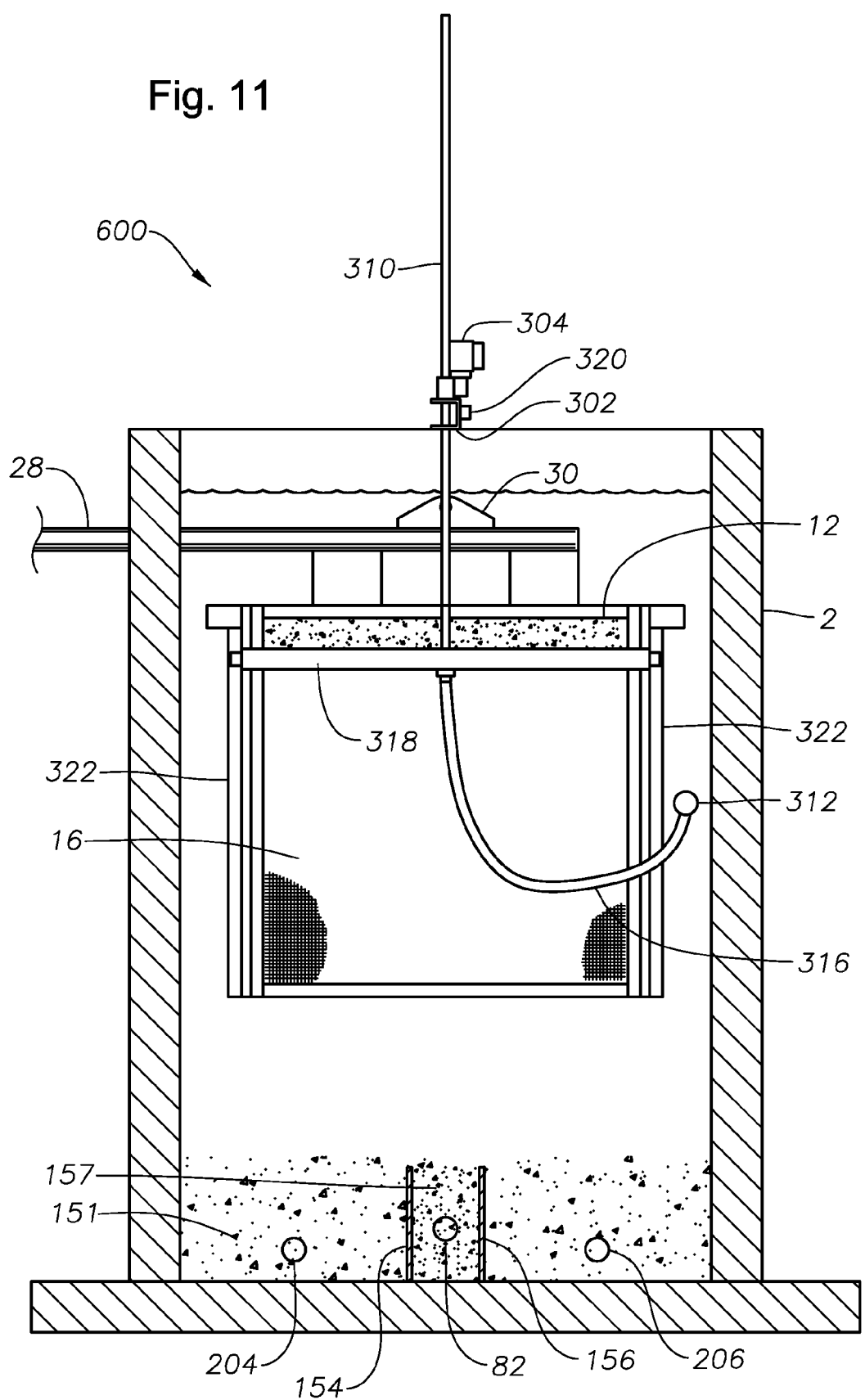

Turning now to FIGS. 9-11, FIG. 9 is a schematic cross-sectional view, and FIGS. 10 and 11 are schematic end elevation views, respectively, of another cloth disk filter embodiment 600 in accordance with the present disclosure. Influent enter this embodiment through an influent conduit 202 and influent trough 4, and valve V6, then passes through influent distribution headers 204, 206, each having a plurality of holes 208. This combination of conduits and headers routes screened influent up through sludge blanket 151, and eventually into cloth filter zone 160. In the illustrated embodiment 600, a drive weldment 302 is provided, which is removably attached to top of vessel 2. Weldment 302 serves as a support for a drive assembly comprising drive motor 304 and drive shaft 306. Motor 304 and drive shaft 306 in turn are mechanically connected to one or more miter gear boxes 308, the number corresponding to the number of lifting screw jacks 310. More than one motor and drive shaft may be provided, as desired. A backwash header 312 is provided, which may include a backwash valve 314, and backwash pump (not illustrated). A set of flexible backwash discharge hoses 316 are fluidly connected on one end to backwash header 312, and on their other ends to respective cross-width backwash arms or hoods 318. Lifting screw jacks 310 are each connected to respective backwash arms 318. As illustrated in schematic end elevation end view of FIGS. 10 and 11, a proximity switch box 320 is provided, typically attached to drive weldment 302, although it may have its own support. Two backwash guide rails 322 are provided for each backwash arm 318. Guide blocks 324 are connected on each end of backwash arm 318 and ride in guide rails 322.

FIG. 10 illustrates backwash arm 318 just beginning its movement upward along cassette 12 and dirty filter cloth 16. FIG. 11 illustrates backwash arm 318 almost finished making a sweep upwards. Note that filter cloth 16 behind (below) backwash arm 318 is now clean. As may be appreciated, substantially all of filter cloth 16 is cleaned using this apparatus and method. A backwash pump may not be required, nor are complicated rotation mechanisms. It will be understood that the backwash features of embodiment 600 may replace the backwash features illustrated in the prior art cloth disk filter embodiment illustrated in FIG. 1, and may be practiced without the sludge blanket feature described herein, in other words where influent enters the top of the vessel 2, as in the embodiments illustrated in FIG. 1.

Figure 12:
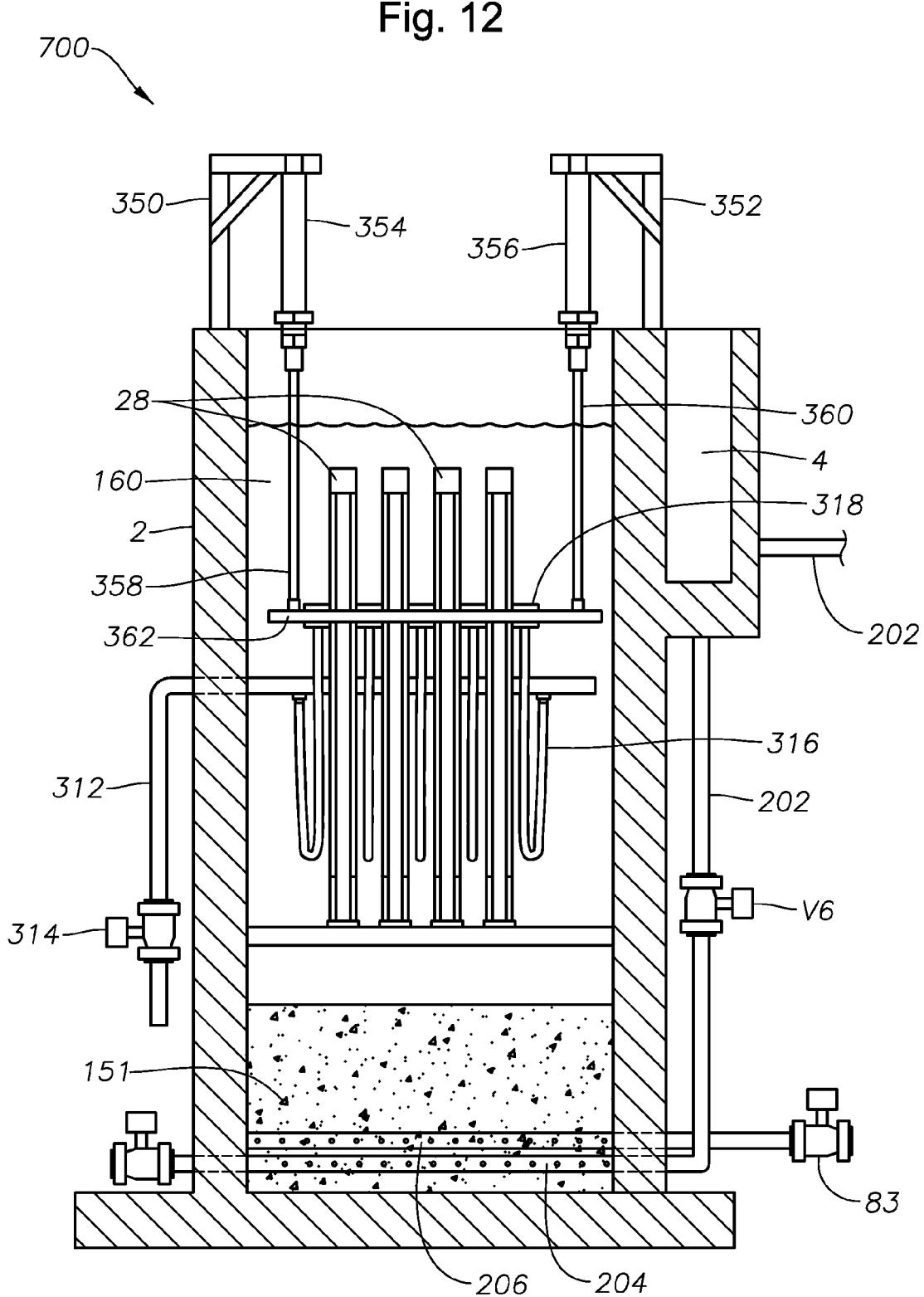
FIG. 12 is a schematic cross-sectional view.
Figure 13:
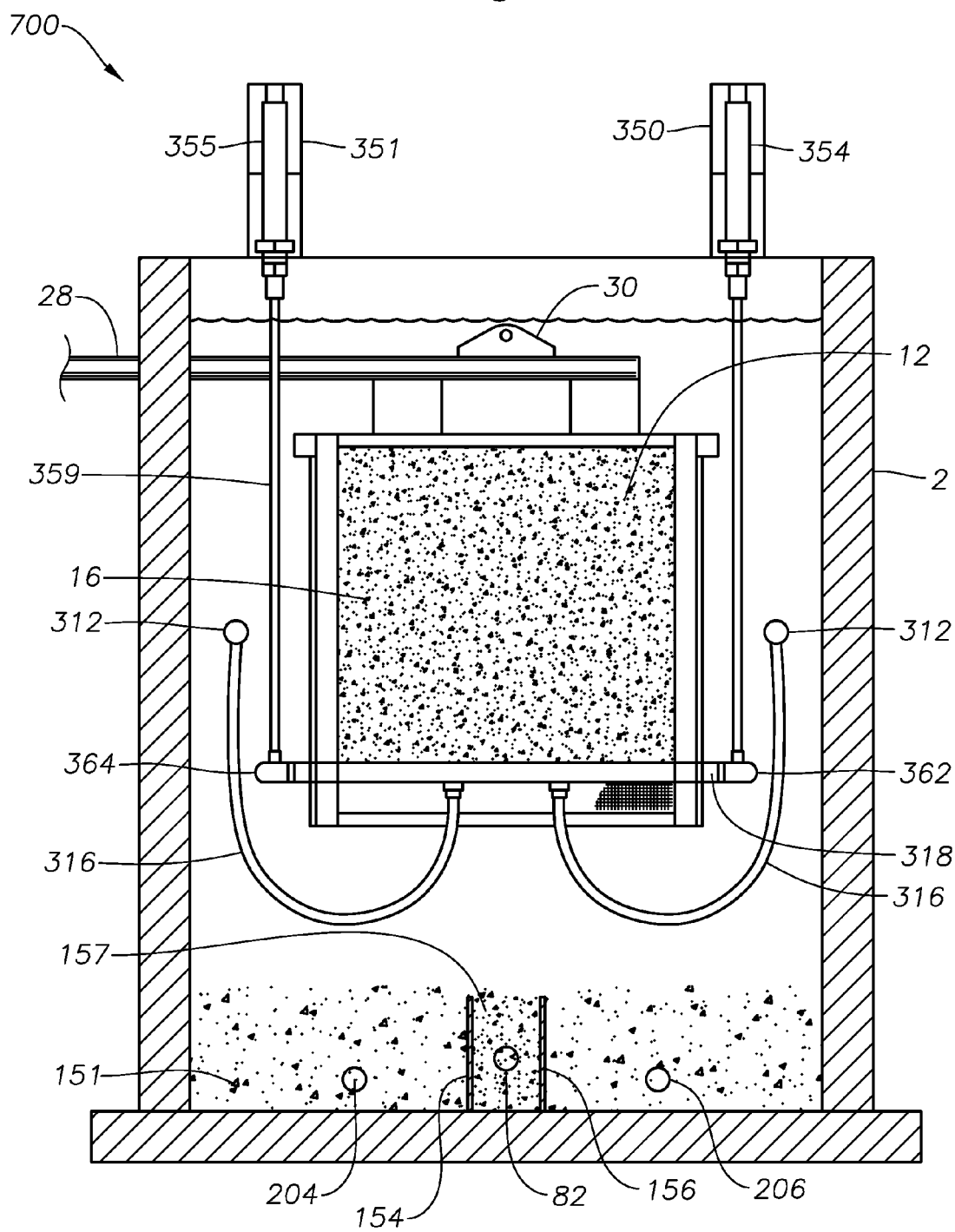
FIGS. 13 and 14 are schematic end elevation views, respectively, of another cloth disk filter embodiment in accordance with the present disclosure.
Figure 14:
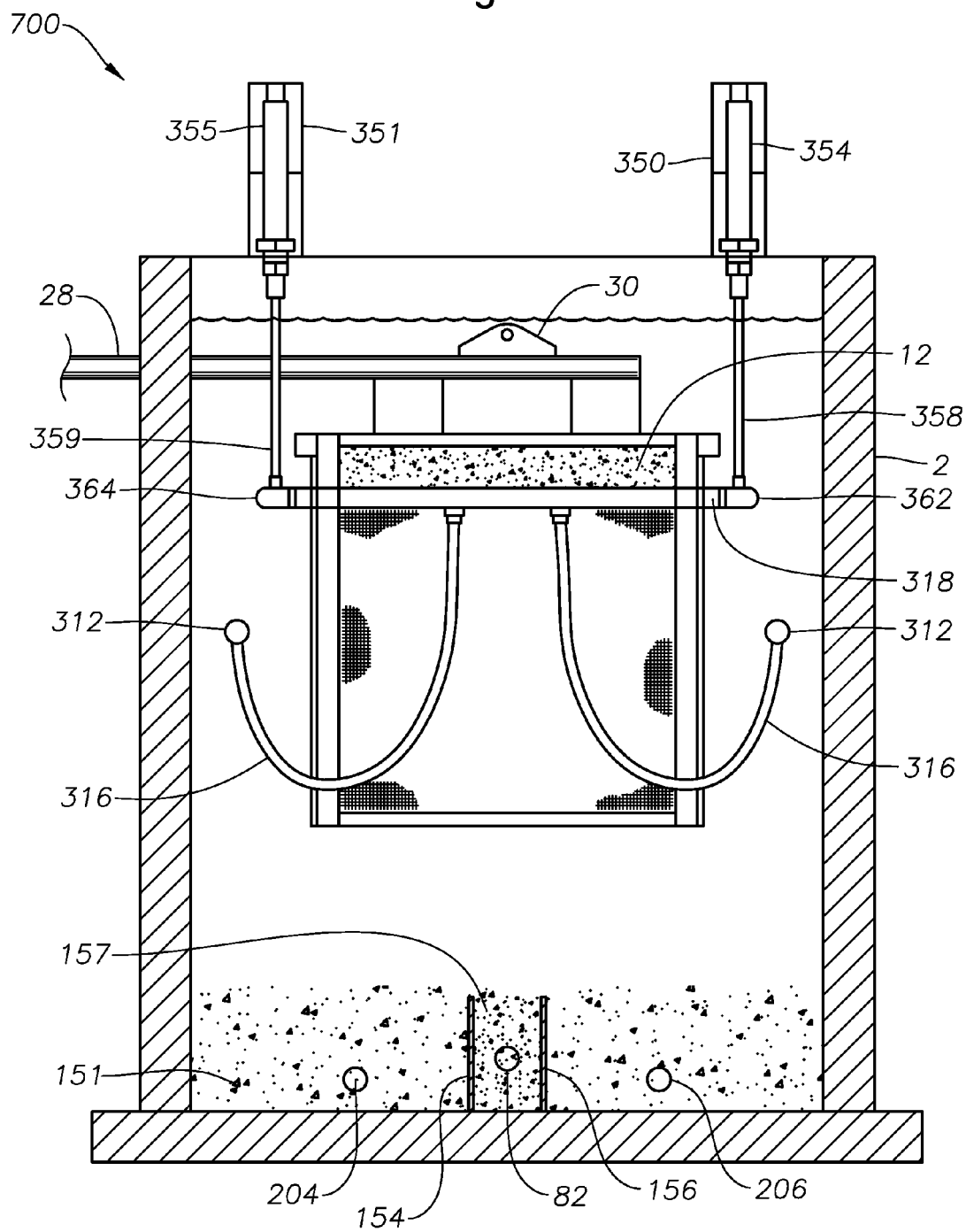

FIG. 12 is a schematic cross-sectional view, and FIGS. 13 and 14 are schematic end elevation views, respectively, of another cloth disk filter embodiment 700 in accordance with the present disclosure. Embodiment 700 is similar to embodiment 600, except in the nature of how the cross-width backwash arms or hoods are moved by a drive assembly. The drive frame weldment 302, and drive assembly comprising drive motor 304, drive shaft 306, motor gear box 308, and lifting screw jacks 310 are replaced by supports 350, 352 (there are only two visible in each of the various views, but four total in embodiment 700), corresponding cylinders 354, 356 (a total of four, only two of which are visible in embodiment 700), and corresponding telescoping tie-rods 358, 360 (a total of four, only two of which are visible in embodiment 700). FIGS. 13 and 14 illustrate support 351, cylinder 355, and its corresponding telescoping tie-rod 359. Cylinders 354, 356 are actuated (electronically, pneumatically, or hydraulically) to force corresponding telescoping tie-rods 358, 360 to move upwards or downwards in telescoping fashion. Tie-rods 358, 360 are connected to support arms 362, 364, which in turn are connected to cross-width backwash arms or hoods 318, as illustrated. Support arms 362, 364 and backwash arms or hoods 318 form a backwash assembly. The entire backwash assembly, including backwash arms or hoods 318, are raised or lowered to wash one or both sides of filter cassettes 12, depending on the number of cross-width backwash arms or hoods 318.

Figure 15:
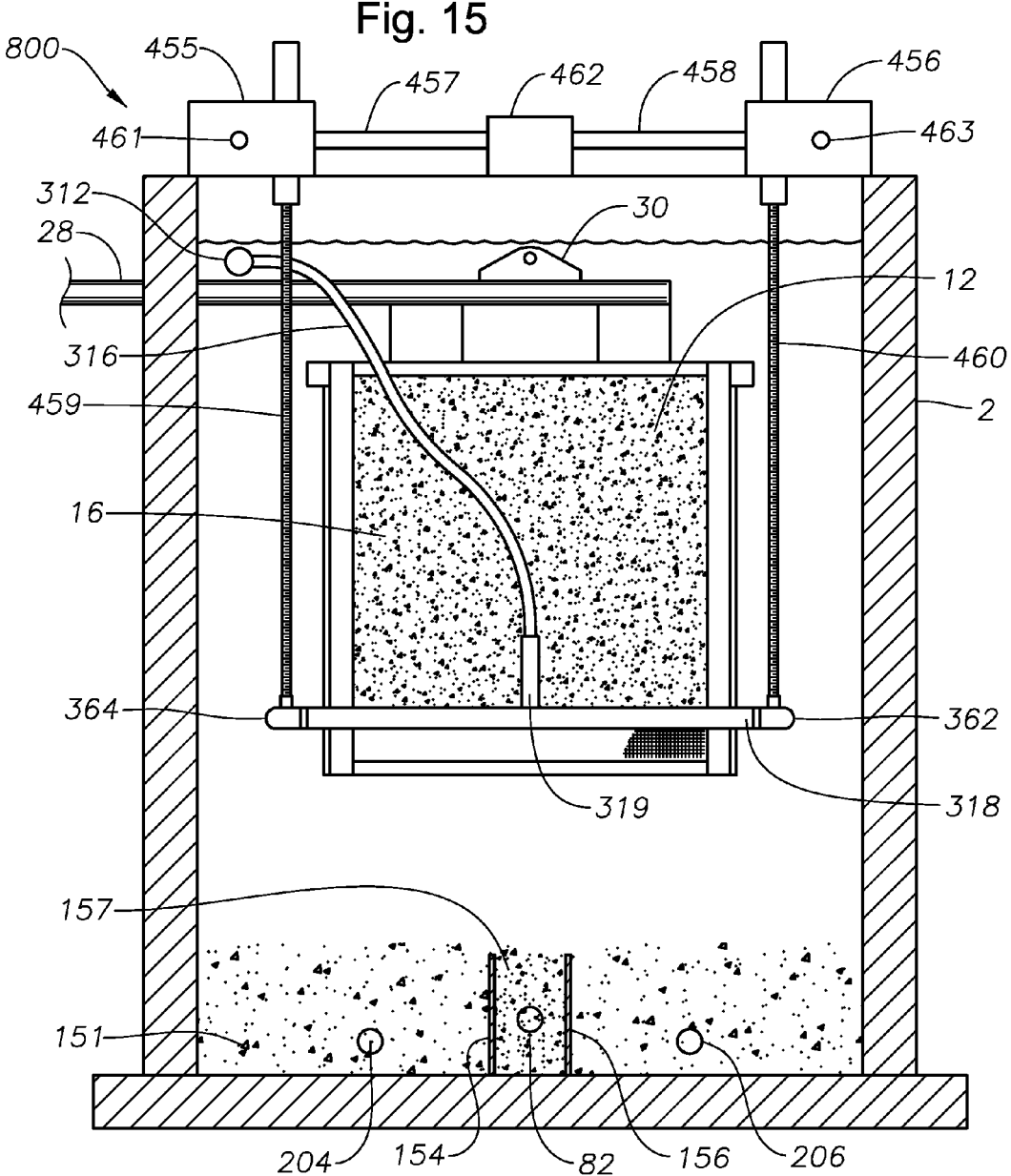
FIGS. 15 and 16 are schematic end elevation views, and FIG. 15A a schematic plan view, of yet another cloth disk filter embodiment in accordance with the present disclosure.
Figure 15A:
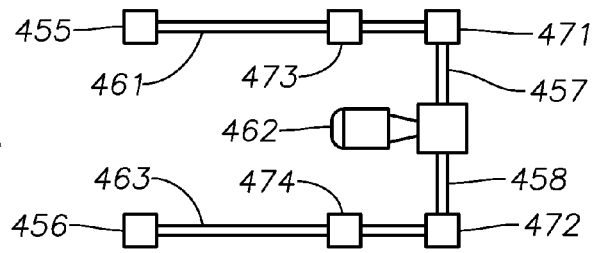
Figure 16:
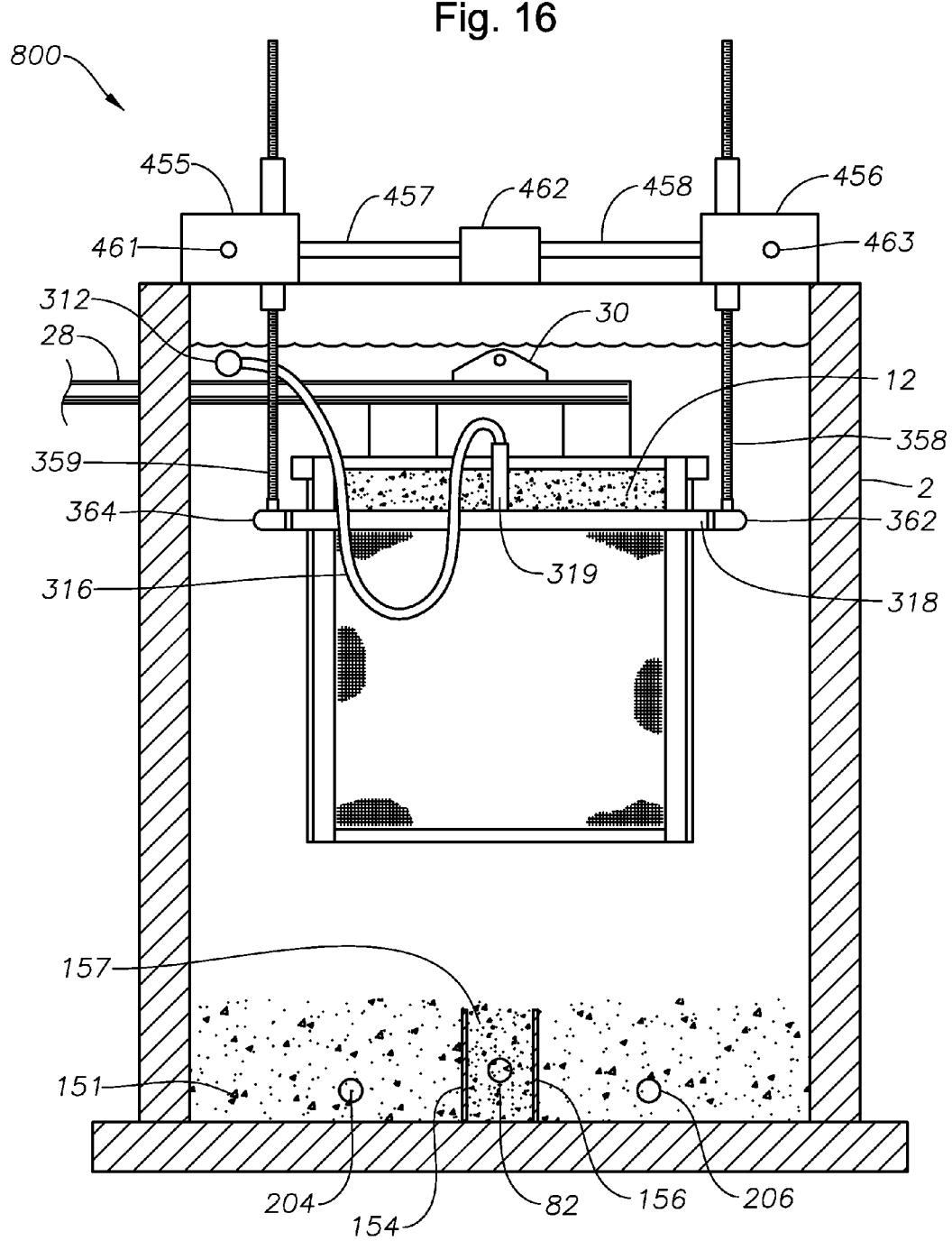

FIGS. 15 and 16 are schematic end elevation views, and FIG. 15A is a schematic plan view of another cloth disk filter embodiment 800 in accordance with the present disclosure. Embodiment 800 is similar to embodiment 700, except in the nature of how the backwash assembly is moved by a drive assembly. Also, in embodiment 800, backwash header 312 is moved from a lower position, such as indicated in FIGS. 12-14, to a position closer to the top of vessel 2 for easier access. Embodiment 800 comprises four screw jacks 455, 456, 473, and 474 (there are only two visible in each of FIGS. 15 and 16, but all four are visible in FIG. 15A). A drive shaft 461 connects jack screws 455 and 473, and another drive shaft 463 connects jack screws 456 and 474, as depicted in FIG. 15A. Drive shaft 461 also is connected to a bevel gear 471, which in turn connects through another drive shaft 457 to a worm gear motor 462. Similarly, drive shaft 463 is connected to a bevel gear 472, which in turn connects through another drive shaft 458 to worm gear motor 462. As indicated in FIGS. 15 and 16, backwash header 312 is now positioned near the top of vessel 2, and a flexible backwash discharge hose 316 connects header 312 to a vertical extension 319 of backwash arm or hood 318. Each backwash arm or hood 312 would have its own vertical extension 319 and flexible backwash discharge hose 316. FIG. 15 illustrates the position of one backwash arm or hood 318 at the beginning of its upward motion to clean cassette 12, and FIG. 16 illustrates the position of one backwash arm or hood 318 near its top, finishing position. In embodiment 800, each screw jack has a corresponding screwed shaft. Two screwed shafts 459, 460 are illustrated in FIGS. 15 and 16. Support arms 362, 364 are the same as in embodiment 700.

Worm gear motor 462 is illustrated positioned to one side in FIG. 15A, as this is more convenient when there are fewer filter cassettes 12, but this is not necessary in all embodiments. When there are a high number of filter cassettes 12, say more than about 4 or 6, worm gear motor 462 may be centrally located in the rectangle formed by the four screw jacks. It may also be possible to use more or less than four screw jacks in certain embodiments.

It will be understood by those skilled in the art that the various features discussed in reference to FIGS. 5-16 and the embodiments described in this disclosure may be combined in certain other embodiments, and with other features that are not described herein but are normally associated with cloth disk filters. For example, the coalescing plates described above and illustrated in FIG. 7 may be present in conjunction with the optional conduits and valves described above and illustrated in FIG. 8. The only required feature in embodiments utilizing the sludge blanket concept is that influent contacts a sludge blanket in a sludge blanket zone prior to the influent contacting one or more cloth filter cassettes in a cloth filter zone, it being understood that upon startup there may not be a sludge blanket present, but that one will develop quickly depending on the amount of flocculent chemical added to the influent upstream of vessel 2 and the amount of solids in the influent. Sludge saved or recycled from a previous filtration operation may be used as the "initial" sludge blanket, if available or desired.

Cloth disk filters are sized on the basis of "hydraulic loading rate", and 3 to 6 gallons/day/ft$^2$ (gpd/ft$^2$) is typical for design average flow rates of prior art cloth disk filters. For flocked phosphorous solids removal, however, prior art cloth disk filter surface overflow rates typically only range from about 2 to about 4 gpd/ft$^2$. Apparatus of the present disclosure may achieve, in some embodiments, from about 3 to about 6 gpd/ft$^2$ even for flocked phosphorous solids removal, which is a 50 percent or 100 percent increase of surface overflow rate over prior art cloth disk filters treating phosphorous-based solids. This improvement, which was not predicted and was not expected prior to testing, is highly desired by water and wastewater treatment plant management, especially for water reuse filtration for golf-courses and other applications for water reuse. There is increased regulation under the Clean Water Act and other laws and regulations that are attempting to limit the amount of phosphorus discharged to receiving streams due to the deleterious effects of the discharge of this nutrient material. The nutrient, phosphorus, causes algae blooms and other adverse impacts which lead to degradation of waterways. A more efficient means of removing phosphorus will make it more cost-effective to implement wider ranging phosphorus control and remediation of impacted receiving streams. The present inventive methods and apparatus are not seeking large removal of solids in the sludge blanket, but removal of enough solids to off-load the filter cloth media. The modified cloth disk filters of this disclosure may be part of a packaged water or wastewater treatment plant.

In operation of methods and apparatus of the disclosure utilizing a sludge blanket, the first choice for solids removal is from the sludge blanket zone and secondly from the cloth disk filter zone to achieve the desired solids removal. The primary goal is to remove only the best settling solids using the sludge blanket. Scum forming and slow settling material is allowed to proceed to the filter cloth media where they would be removed. As noted in reference to FIG. 7, cloth disk filter apparatus of this disclosure may employ one or more plate settlers. These plates are used to increase settling rate of floc, minimizing sludge blanket disturbance and carry-over of settled sludge to the filter media, thereby maximizing the effective volume and surface area of the cloth disk filter. To ensure that the sludge blanket remains intact in the sludge blanket zone and substantial amount of floc is not carried over to the cloth filter zone, the velocity of the upwardly moving flocculated influent from the distribution headers is maintained at a velocity just over the settling velocity of the floc, but not more than a velocity that would fluidize or substantially disrupt the sludge blanket by becoming too turbulent. By experiment, this velocity has been determined to range from about 1 to about 2 gallons per minute/ft$^2$ for cloth disk filters modified to have influent distribution headers and other features described herein for creating a sludge blanket zone near the floor and extending upwards from the floor of a cloth disk filter.

Filter cloth media useful in the various embodiments of this disclosure are in certain embodiments able to filter out solids having particles sizes of 10 microns or larger, or 5 microns and larger, and withstand washing or mechanical abrasion enough to remove retained materials, and may be characterized as organic polymeric filter cloth media or inorganic filter cloth media depending on the material performing the separation function. A single disk or cassette of a cloth disk filter may have a filter area ranging from 1 to about 200 ft$^2$, or from 1 to about 50 ft$^2$, or from 1 to about 20 ft$^2$, and there may be upwards of 10 filter cassettes in a single combined sludge blanket/filtration vessel. The filter area is dictated largely by the filtration task at hand, size of the vessel and influent solids loading and flow rate, and the like. It is understood that an organic filter cloth media might comprise inorganic materials, and vice versa. Suitable cloth filter media may be woven or nonwoven, and may comprise one layer or may be multi-layered. The material selected for the filter cloth media should have numerous attributes that render the filter cloth media suitable for filtration service, such as structural integrity to withstand the pressure gradients of filtration and backflushing, and chemical resistance to attack or dissolution by the filtered species, filtrate, and chemical cleaning solutions such as chlorine, citric acid, sodium hydroxide, and other chemicals designed to minimize organic and inorganic fouling of the filter cloth media. The material should also have the ability to be fabricated readily into the preselected filter cloth media shape for a particular application. One useful cloth filter material is a nonwoven, needlefelted nylon (polyamide) fiber-based material. The same material in "pile" form is another suitable filter material. "Pile" and "needlefelting", and "needling" are terms of art in the manufacture of non-wovens, and are readily understood by those skilled in the nonwovens art. Piled materials may also be needlefelted. Additional design criteria and considerations in the fabrication and selection of cloth disk filter media are disclosed in Purchas and Sutherland, "Handbook of Filter Media", Elsevier Science Ltd. (2002), which is incorporated herein by reference, and especially Chapters 2 and 3 entitled "Woven Fabric Media" and "Nonwoven Fabric Media", respectively. Patents describing piled and/or needled nonwovens include U.S. Pat. Nos. 3,673,048 and 3,755,055, both incorporated herein by reference. In certain embodiments, the filter material may comprise membrane materials or fine screened mesh (such as stainless steel screen mesh).

Pumps described in the various embodiments may be submersed in the liquid in vessel 2; they are illustrated in the various figures herein as not submersed mainly to ease illustration of the inventive features described herein. Apparatus and methods of this disclosure may also include, or be fluidly connected with a chemical addition system, which may include mixers, pumps, tanks for flocculating chemical and other chemicals, which may be polymeric, flow meters, and the like. Apparatus and methods of the present disclosure may include various sampling and viewing ports, as well as physical, chemical and biological property measurement devices, such as temperature, pressure, turbidity, flow rate (mass and/or volume), color, composition, particle size, and the like. The details of these sub-systems are readily understood by those skilled in the water and wastewater treatment engineer, and require no further explanation herein. It is also very common today to include data logging systems, such as one or more PCs and/or server computers running data acquisition software which may be accessed onsite or remotely.

In operation, modified cloth disk filters of the present disclosure employing a sludge blanket operate as follows. Flow enters the filter through an influent conduit as described in FIGS. 5, 9, 12, and 15, and through one or more influent distribution headers near the bottom of the cloth disk filter vessel. At steady state, after a sludge blanket has been built up, or transferred into vessel 2 from prior operations, the influent first moves substantially upward through and contacts the sludge blanket in the sludge blanket zone, removing the heavier and/or larger floc portions. The partially cleaned influent then moves up into the cloth disk filter zone and completely surrounds the cassettes and cloth filter media. As the flow passes through the cloth filter media, any remaining suspended solids are removed. The operator monitors the operation to view the filtered effluent of each filter cassette through the individual discharge ports. As solids accumulate on the cloth filter media, the flow through the media becomes restricted and the level of liquid in the vessel rises. The backwash process is triggered when the level reaches a pre-determined point or after a set time period. The outside-to-inside flow ensures that solids stay trapped within the vessel. In embodiments of FIGS. 5-8, at least some of the vacuum shoes rotate across the surfaces of the disks, removing captured solids from the media. In certain embodiments, the vacuum shoes rotate clockwise 360 degrees and then return counter-clockwise in sequence for efficient media cleaning, but this is not strictly necessary. The fixed-disk design incorporates one or more fixed disks with rotating suction shoes that do not touch the cloth media, thus extending the life of the media. In embodiments 600, 700, and 800 illustrated in FIGS. 9-16, backwash arms move upwards or downwards, or reciprocate upwards and downwards as desired. In the embodiments illustrated in FIGS. 5-16, there is no need to drain the tank when replacing cassettes, saving water treatment facilities time and money. In certain embodiments, each disk may be monitored separately, so effluent performance may be easily verified and segments requiring service are easily identified. Cloth disk filters described herein may be combined with activated sludge systems, such as conventional activated sludge, extended aeration, complete mix activated sludge, continuous flow activated sludge, various batch reactor activated sludge systems, integrated fixed-film activated sludge (IFAS) and submerged fixed film (SFF) systems.

Cloth disk filters of this disclosure can be retrofitted to existing concrete basins or sold as complete stand-alone filtration units. The units are user-friendly, high performance tertiary filters, suitable for both small and large flow applications, that remove suspended solids as small as 10 microns or less in certain embodiments, suitable for use in water and wastewater plants that have stringent suspended solids discharge permit requirements, phosphorous limits or require re-use quality effluent.

The various advantages and disadvantages of the above-cited filter cloth media module configurations and modes are understood by those of ordinary skill in the art. Selection of filter cloth media module configuration and mode of operation typically devolves to choosing those which provide maximum advantage and least disadvantage for a specific separation to be effected.

Although the foregoing examples and description are intended to be representative of the disclosure, they are not intended to in any way limit the scope of the appended claims.

What is claimed is:

1. An apparatus for treating water or wastewater comprising:
    a) a vessel having a floor and walls defining a cloth filter zone comprising one or more cloth filter cassettes positioned substantially vertically therein, at least one cassette removably positioned in respective vertical cassette guide members; and
    b) at least one cassette having associated therewith at least one backwash assembly fluidly connected to at least one backwash header positioned to one side of the cassettes, at least one backwash assembly comprising a backwash arm positioned adjacent at least one main filter surface of the one or more cloth filter cassette, the backwash arm slideable in respective backwash arm guide members and dimensioned to backwash substantially all of a main filter surface;
    wherein the backwash assembly is driven by a drive assembly, the drive assembly comprising a set of screw jacks, a first drive shaft connecting two screw jacks, and a second drive shaft connecting two other screw jacks, each drive shaft also connected to a first bevel gear, which in turn connects through a third drive shaft to a worm gear motor, the second drive shaft connected to a second bevel gear which in turn connects through a fourth drive shaft to the worm gear motor.

2. The apparatus of claim 1 wherein the backwash assembly comprises first and second main filter surface backwash arms for each cassette, the backwash arms fluidly connected to the backwash header.

3. The apparatus of claim 2 wherein the backwash arms are cross-width, substantially horizontal backwash arms.

4. The apparatus of claim 1 wherein flexible conduits fluidly connect each backwash arm to a fixed backwash header.

5. The apparatus of claim 1 wherein rigid, telescoping conduits fluidly connect each backwash arm to a fixed backwash header.

6. The apparatus of claim 1 wherein the backwash arms move vertically in the guide members, sweeping the filter cloth surface from the bottom to top, or alternatively from top to bottom.

7. The apparatus of claim 1 wherein the backwash arm travel stop is controlled by a proximity switch.

8. The apparatus of claim 1 comprising a backwash pump fluidly connected to the backwash header.

* * * * *